UNITED STATES PATENT OFFICE.

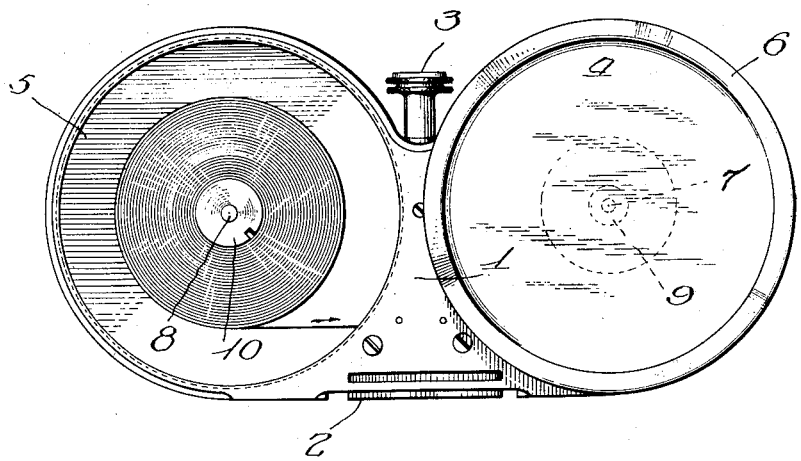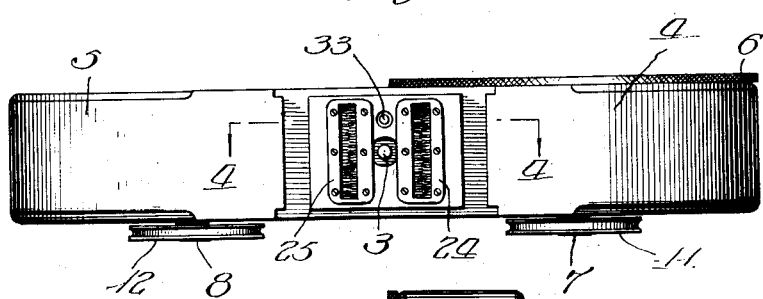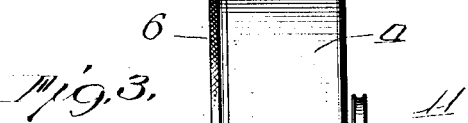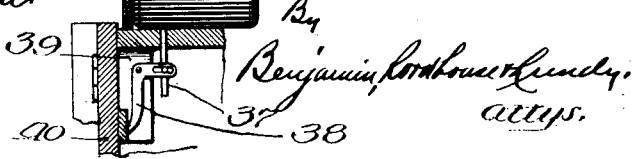

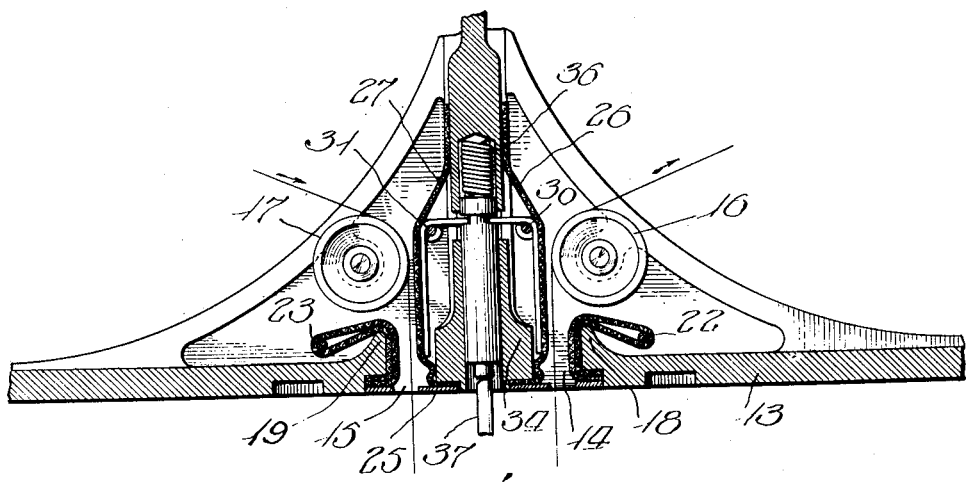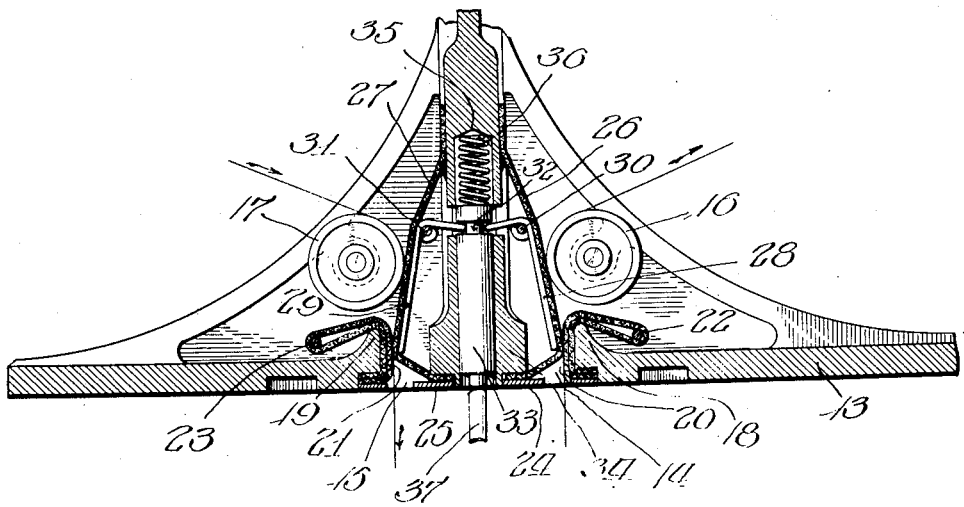

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

FILM-MAGAZINE FOR CINEMATOGRAPH OR MOTION-PICTURE CAMERAS.

1,215,534.  Specification of Letters Patent.  Patented Feb. 13, 1917.

Application filed February 6, 1915. Serial No. 6,457.

*To all whom it may concern:*

Be it known that I, ALBERT S. HOWELL, a citizen of the United States, residing at Chicago, in the county of Cook and State of Illinois, have invented certain new and useful Improvements in Film-Magazines for Cinematograph or Motion-Picture Cameras, of which the following is a specification.

My present invention relates to improvements in magazines or devices for holding and supplying film to and receiving it from the camera and to the storing of the sensitized film which is employed in the taking of the views. It is of course understood that the accidental or unintentional exposure of such film to the light immediately destroys it, and that the presence of any dust upon the film is liable to cause spots or streaks upon the negatives and subsequent positive views taken therefrom.

The object of my present invention is the provision of a convenient and suitable housing which may be attached to the camera from which unexposed film may be drawn into the camera and into which exposed film may be drawn from the camera and which will protect the film from dust and from exposure to light. Another object of my invention is the provision of means operable by movement of the camera door, either when it is open through accident or for the purpose of adjusting the mechanism therein, for immediately closing and sealing the magazine against the entrance of either light or dust.

I attain the above objects by means of the mechanism illustrated in the accompanying drawings, of which—

Figure 1 is a side elevation of a film magazine embodying my invention, in which the cover for the film receiving compartment has been unscrewed and removed;

Fig. 2 is a bottom plan of the structure shown in Fig. 1;

Fig. 3 is an end elevation of the structure shown in Fig. 1 with the means for operating the light and dust traps;

Fig. 4 is a fragmental sectional view showing the details of the light and dust trap open for passage of film and drawn to an enlarged scale;

Fig. 5 is a view similar to Fig. 4 in which the light and dust trap is shown closed.

Similar reference characters refer to similar parts throughout the several views.

It will of course be understood that the motion picture or cinematograph cameras are provided with facilities for moving the film into position for exposure and that the magazine is for holding the film before exposure and also receiving said film and storing it after exposure. Only a portion of the top of the camera has been illustrated to show the means for operating the light and dust trap of the magazine. The magazine is secured to the top of the camera in any suitable manner and a convenient form for so securing the magazine is such as is shown in the drawings of this application, such a form comprises a central portion 1, the base 2 of which is adapted to contact with the top of the camera, and to be secured thereto by an elongated set screw 3 passing down centrally through the central portion 1 into the top of the camera. Upon either side of the central portion 1 are preferably cylindrical film compartments 4 and 5 respectively which are closed against the admission of light and dust by means of screw caps or covers 6. Journaled centrally of the cylindrical compartments 4 and 5 are arbors 7 and 8 which extend through a wall of the compartments. Upon the portion of the arbors 7 and 8 which extend into the compartments 4 and 5 are mounted spools 9 and 10 upon which the film is wound, and upon the portions of the arbors which extend outside of the compartments 4 and 5 are mounted grooved pulleys 11 and 12 from which run bands to pulleys upon the camera so as to rotate said spools 9 and 10 to respectively unwind the unexposed and wind up the exposed film simultaneously with the feeding of the film to the camera and its withdrawal therefrom.

The bottom wall 13 of the central portion 1 of the magazine is preferably provided with two transversely disposed parallel slots or openings 14 and 15 through which the film is adapted to pass on its way to and from the camera and above said openings are journaled suitable idle rollers 16 and 17 respectively for guiding the film to and from said openings. The bottom wall 13 is preferably widened adjacent the outer edges of openings 14 and 15 to provide inwardly projecting lugs 18 and 19 and strips of fabric (preferably a pile fabric) are folded upon themselves and secured against said lugs by looping the folded portions over transverse pins 22 and 23 within said magazine and by means of slotted plates 24 and 25 secured to the bottom of wall 13 as shown in Figs. 4 and 5. Other strips of flexible pile fabric 26 and 27 are secured at their lower ends to the bottom wall 13 by plates 24 and 25 respectively and are extended up inside the magazine and have their upper ends secured adjacent the apex of the central member 1 of the magazine. I prefer to dispose these last mentioned strips 26 and 27 so that they will hang loosely or sag and permit the portion thereof intermediate the ends to be moved toward and away from the coöperating strips 20 and 21 for the purpose of tightly closing the openings through which the film passes when the camera door is opened.

In Figs. 4 and 5 I have illustrated a preferred mechanism for moving the flexible strips 26 and 27 in the manner just described. This mechanism comprises substantially L-shaped plates 28 and 29 that are pivotally mounted at their angles upon studs 30 and 31 projecting from the side walls of the body member 1. The longer arms of said plates are adapted to contact with the rear surfaces of strips 26 and 27, while the shorter lateral arms thereof project toward each other and enter an annular groove 32 made in the adjacent upper portion of a reciprocable plunger 33. This plunger is preferably mounted in the bore of a vertically disposed bearing 34 arising from the bottom wall of the magazine. Above and alining with the bore of bearing 34 the casting is bored out to form a seat 35 in which a coiled expansion spring 36 is placed so that its lower end will bear against the upper end of plunger 33 to keep the latter normally at the limit of its downward movement in which position the openings 14 and 15 will be closed by the fabric strips.

In order to actuate the plunger 33 the camera is preferably provided with a reciprocable rod 37 that projects through the upper wall thereof in alinement with and contacting plunger 33, said rod being operated by means of a suitable bell-crank lever 38 pivotally mounted upon a bracket or lug 39 projecting from one of the walls of the camera adjacent the door 40 thereof. The free lower arm of bell crank lever 38 contacts with the camera door when the latter is closed thus forcing the rod 37 and plunger 33 to the limit of their upward movement which elevates the short lateral ends of plates 28 and 29 to clear the openings 14 and 15 in the magazine. When the camera door 40 is opened the bell crank will swing on its pivot permitting the downward movement of rod 37 and plunger 33 through the action of spring 36 thus causing the plates 28 and 29 to move in the opposite direction across openings 14 and 15 carrying the flexible strips 26 and 27 with them to close said openings.

While I have herein illustrated and described certain specific means for carrying out my invention it of course will be obvious to others skilled in the art that various modifications or refinements thereof are possible without materially departing from the spirit of my invention. I therefore desire it understood that all such modifications or refinements are contemplated within the scope of my invention as expressed in the appended claims.

I claim:

1. A film magazine for cinematographic cameras comprising a suitable compartment for the reception of film and provided with an opening for the passage of film, means for closing said opening comprising a strip of material adapted to be moved across said opening, a device within said magazine for moving said strip, and an element actuated by the camera door adapted to move said device.

2. A film magazine for cinematographic cameras comprising two compartments for the reception of the film and provided with openings through which the film passes to and returns from the camera, and means actuated by the camera door for closing said openings simultaneously during the opening of the camera door.

3. A film magazine for cinematographic cameras comprising two compartments for the reception of the film and provided with openings through which the film passes to and returns from the camera, and means for closing said openings, comprising separate strips of material adapted to be moved across said openings, and simultaneously operated devices actuated by the camera door for moving said strips.

4. A film magazine for cinematographic cameras comprising two compartments for the reception of the film and provided with openings through which the film passes to and returns from the camera, means for closing said openings comprising separate strips of flexible material secured at their respective ends to produce a sagging intermediate portion, and devices for extending said intermediate portion across said openings.

5. A film magazine for cinematographic cameras comprising two compartments for the reception of the film and provided with openings through which the film passes to and returns from the camera, and means for closing said openings comprising separate strips of flexible material secured at their ends to produce a sagging intermediate portion, pivoted swinging plates adapted to engage and extend the intermediate portions of said material across said openings, and devices for swinging said plates.

6. A film magazine for cinematographic cameras comprising two compartments for the reception of the film and provided with openings through which the film passes to and returns from the camera, and means for closing said openings comprising separate strips of flexible material secured at their ends to produce a sagging intermediate portion, substantially L-shaped plates pivoted adjacent said strips, one arm of each of which is adapted to engage the intermediate portion of one of said strips and extend the latter across its respective opening, and operative devices engaging the other arm of each of said plates.

7. A film magazine for cinematographic cameras comprising a hollow body provided with film entrance and exit passages, a closure element for each passage, pivoted means adapted to operate said element, and devices engaging and operating said pivoted means.

8. A film magazine for cinematographic cameras comprising a hollow body provided with film entrance and exit passages, a closure element for each passage, pivoted means adapted to operate said element, and a reciprocable plunger engaging and operating said pivoted means.

9. A film magazine for cinematographic cameras comprising a hollow body provided with film entrance and exit passages, a closure element for each passage, pivoted plates adapted to operate said element, and a reciprocable plunger engaging and operating said pivoted means.

10. The combination with a cinematographic camera provided with a door, of a film magazine therefor provided with film passages, and means actuated by the opening and closing of said camera door for respectively closing and opening said passages.

11. The combination with a cinematographic camera provided with a door, of a film magazine therefor provided with film passages, flexible strips adapted to be moved across said passages, and devices actuated by the opening and closing of said camera door for moving said strips relative to said passages.

12. The combination with a cinematographic camera provided with a door, of a film magazine therefor provided with film passages, flexible strips adapted to be moved across said passages, a spring pressed plunger, pivoted substantially L-shaped plates the shorter arms of which engage said plunger and the longer arms of which engage said flexible strips, and a reciprocable rod actuated by the movement of the camera door and adapted to coact with said plunger.

In witness whereof, I have hereunto set my hand and seal, this 3rd day of February, 1915.

ALBERT S. HOWELL. [L. S.]

Witnesses:
E. K. LUNDY, Jr.,
WM. HAROLD EICHELMAN.